United States Patent [19]

Friedman et al.

[11] Patent Number: 4,563,281
[45] Date of Patent: Jan. 7, 1986

[54] ANAEROBIC CONTACTOR

[75] Inventors: Alexander A. Friedman, Fayetteville, N.Y.; Peter L. Podolak, Westminster, Md.

[73] Assignee: Syracuse University, Syracuse, N.Y.

[21] Appl. No.: 628,904

[22] Filed: Jul. 9, 1984

[51] Int. Cl.[4] .............................................. C02F 3/28
[52] U.S. Cl. ..................................... 210/614; 210/619
[58] Field of Search ............... 210/603, 614, 619, 741, 210/137, 143, 150, 151

[56] References Cited

U.S. PATENT DOCUMENTS

| 3,869,380 | 3/1975 | Torpey | 210/619 X |
| 3,871,999 | 3/1975 | Torpey | 210/619 X |
| 4,211,647 | 7/1980 | Friedman et al. | 210/619 X |

Primary Examiner—Thomas Wyse
Attorney, Agent, or Firm—Bruns and Wall

[57] ABSTRACT

In the treatment of high strength wastewater containing anaerobically digestible nutrients and organic substrates, the water is passed through a sealed reactor housing and the pressure in the headspace over the water is reduced under controlled conditions to provide for optimum operating conditions.

6 Claims, 6 Drawing Figures

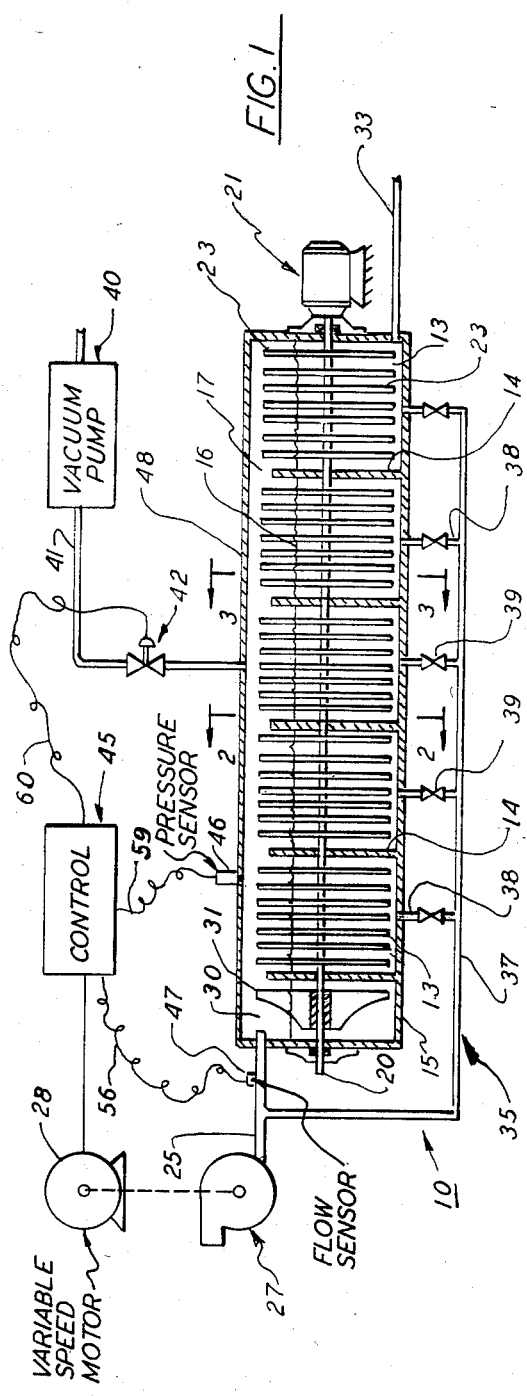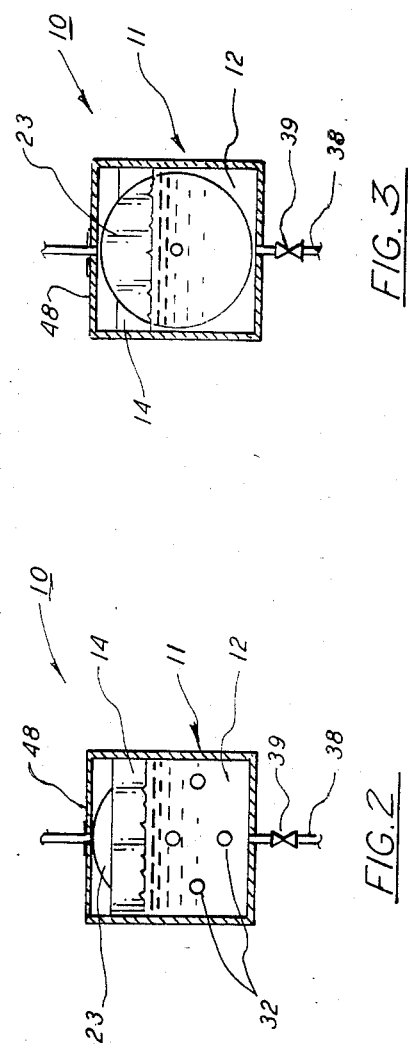

FRACTIONAL COD REMOVAL AS A FUNCTION OF
HEADSPACE PRESSURE-LINEAR LOADING RANGE

MAXIMUM COD REMOVAL - NON LINEAR

ANAEROBIC CONTACTOR

BACKGROUND OF THE INVENTION

This invention relates to an improved wastewater treatment system and, in particular, to the control of an anaerobic system for treating high strength wastewater. As evidenced in U.S. Pat. Nos.:

| 3,640,846 | 3,724,542 | 3,817,857 | 3,994,780 |
|-----------|-----------|-----------|-----------|
| 4,043,936 | 4,067,801 | 4,100,023 | 4,134,830 | many different types of anaerobic systems have been devised for treating wastewater containing various biodegradable substrates and nutrients. All these systems operate under ambient or atmospheric conditions and are for the most part rate limited in terms of the amount of influent that can be efficiently passed through the system. The physical transport of gaseous end products through a biofilm can significantly influence the anaerobic decomposition of organic waste. Anaerobic biofilms are extremely porous materials and the rapid generation of microbubbles bubbles therein, usually of carbon dioxide and methane, can block the transport of nutrients and substrate to the organic cell sites. Transport of exoenzymes and other metabolic end products are also constrained by the microbubbles. An increase in the concentration of these materials beyond a certain level further results in product inhibition and/or the accumulation of toxic materials at the cell sites.

Molecular hydrogen ($H_2$) is a key intermediate in controlling complex interspecies reactions occurring during the anaerobic degradation of waste in a fluid medium. Molecular hydrogen is released by one group of microorganisms into solution and used by methanogens to reduce carbon dioxide to methane. By the same token, high partial pressure of $H_2$ in solution causes the conversion of substrate such as ethanol, propionate and bytyrate to methane to produce unfavorable free energy levels. Therefore, when operating under atmospheric conditions, the partial pressure of $H_2$ must be maintained within a very narrow range to efficiently produce methane.

Sulfides are also produced in solution from sulfates and sulfur containing compounds that are also present in the wastewater. This, in turn, raises the toxic levels of sulfides in the biofilm to a point where the effectiveness of the anaerobic bacterial system is adversely affected. As will be explained in greater detail below, many of the critical parameters that adversely affect the complex metabolic interactions of various species involved in anaerobic processes can be controlled or reduced by controlling the headspace pressure over the wastewater as it is being treated. By operating the system at subatmospheric conditions, gas pressures in and about the biofilms can also be relieved by reducing their solubility in the wastewater.

SUMMARY OF THE INVENTION

It is therefore an object of the present invention to improve anaerobic reactors for treating high strength wastewater.

It is a further object of the present invention to provide an improved subatmospheric reactor for enhancing biofilm performance in an anaerobic wastewater treatment system.

A still further object of the present invention is to control the operation of a subatmospheric anaerobic reactor to optimize the removal rate of the system over a wide range of influent flows.

Another object of the present invention is to reduce the gas solubility in an anaerobic reactor to encourage the rapid and efficient removal of inhibiting and toxic gases from the solution to permit continuous operation of a heavily loaded system.

Yet another object of the present invention is to reduce the operating pressure of an anaerobic reactor to facilitate the removal of microbubbles trapped in the biofilm which interfere with the release of exoenzymes and thus block the removal of metabolic wastes.

These and other objects of the present invention are attained by means of an anaerobic reactor that includes a gas tight housing having a shaft passing therethrough upon which is affixed a series of contactors that are sequentially passed through wastewater contained in the housing and the headspace over the wastewater. Anaerobic organisms form a biofilm on the contactor which feed upon anaerobically digestible nutrients and organic substrates. A vacuum pump and an influent pump are controlled by a microprocessor to vary the headspace pressure in response to the state of the influent to maintain the reactor at optimum operating conditions over a wide loading range.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a side elevation in section showing a reactor embodying the teachings of the present invention;

FIG. 2 is a section taken along lines 2—2 in FIG. 1;

FIG. 3 is a section taken along lines 3—3 in FIG. 1;

DESCRIPTION OF THE INVENTION

Figure 4:
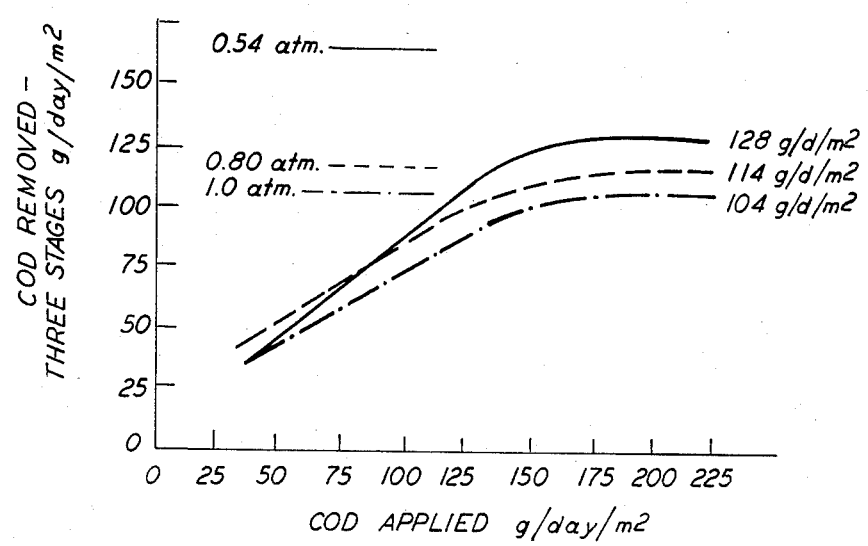
FIG. 4 is a graphic representation showing the response of the present reactor in terms of COD areal removal at different headspace pressures.

Referring initially to FIGS. 1-3 there is shown an anaerobic reactor, generally referenced 10, for treating high strength wastewater containing anaerobically digestible nutrients and organic substrates. The reactor system includes a gas and liquid tight housing 11 that is capable of containing a quantity of wastewater 12 therein that might include biodigestible materials such as carbohydrates, fats, proteins, alcohols, acids and the like that are either soluble or insoluble in the wastewater and which can exist alone or in combination with other substrates and nutrients. The housing is partitioned into a number of individual compartments or stages 13—13 of equal volume by means of partitions 14—14. However, in some applications it may be desirable to use stages of unequal size.

The partitions 14—14 extend upwardly from the floor 15 of the reactor housing to an elevation that is slightly above the normal level 16 of the wastewater maintained therein. This provides for a continuous relatively uninterrupted headspace 17 over the wastewater whereby the pressure over each stage remains the same during anaerobic activities. As will be explained in greater detail below, the headspace gas pressure is reduced under controlled conditions to a predetermined subatmospheric value during anaerobic treatment of the wastewater to increase both the volumetric and areal COD removal rates to provide for more efficient wastewater treatment. The term COD as herein used refers to the chemical oxygen demand of the nutrients and substrates and is well known in the art as a measure of the wastewater strength in terms of milligrams per liter.

A horizontally disposed shaft 20 is mounted in the housing upon suitable watertight bearings and is operatively coupled to a variable speed drive motor 21. Secured to the shaft at spaced intervals within the housing are a plurablity of contactors 23—23. Each contactor is a plastic disc that is affixed to the shaft for rotation therewith. The discs are positioned so that an equal number are contained within each reactor stage with about between 50%–80% of the surface of each disc being immersed in the wastewater. In practice, colonies of anaerobic microorganisms form a biomass upon the surfaces of each disc which is capable of feeding upon digestible nutrients and substrates found in the wastewater. The partially immersed disc draws the biomass sequentially through the wastewater and the headspace so that nutrients and substrates are removed from the wastewater for a portion of each revolution of the shaft and process gases are readily expelled into the headspace for the remaining portion thereof. This establishes a controlled feeding cycle within the system which overcomes many of the problems associated with systems in which the biomass is completely flooded.

Influent is brought into the reactor housing via an inlet pipe 25 connected to the discharge side of an influent pump 27. The pump is driven by a variable speed motor 28 whereby the rate of entry of influent wastewater into the housing can be closely regulated. Initially the influent passes through a mixing chamber 30 that contains an impeller 31 secured to shaft 20 which serves to premix the influent and keeps the wastewater contained in the housing agitated. The wastewater passes between stages via holes 32—32 (FIG. 2) formed in the partitions separating the stages and is finally passed out of the housing via discharge line 33. As can be seen, each treatment stage is segregated by the partitions so that concentration of nutrients and substrates in the wastewater is lowered in stages as the wastewater moves laterally through the housing. Progressive lowering of the concentration gradient promotes good waste removal while at the same time minimizes reactor space. To extend the operational capacity of the reactor, an auxiliary influent delivery system, generally referenced 35, is furnished which is able to introduce raw influent into one or more selected stages. A bypass line 37 diverts a portion of the influent leaving the influent pump below the housing beneath each of the stages. The line is connected into each stage by a supply line 38 that passes through the floor of the housing and a remotely controlled valve 39. The valves are capable of being selectively adjusted to regulate the amount of raw influent that is introduced into each treatment stage.

A vacuum pump 40 is connected to headspace of the reactor via line 41 and a vacuum control valve 42 that is operable to regulate headspace pressure within the reactor housing. A controller 45, which can be a suitable microprocessor, is programmed to regulate the activity of both the influent pump motor and the vacuum control valve 42 in response to data provided by a pressure sensor 46 and a flow sensor 47. The pressure sensor is situated in the roof 48 of the reactor housing and is arranged to measure the headspace pressure maintained in the housing. The influent flow sensor is mounted in influent line 25 and is arranged to measure the date of flow of the entering wastewater. The speed of the influent pump and the pressure in the housing are adjusted by the controller to maintain the reactor at optimum operating conditions over a wide range of loading conditions.

The invention will now be described in greater detail with reference to an example wherein a reactor of the type described was constructed having an internal volume of 6.5 liters. The reactor was approximately 60 cms long and was divided into four stages of equal volume using fixed partitions each of which contained eight 1.88 cm holes to allow solids, gases and liquids to pass between stages. Each stage contained ten 12.70 cm diameter contactors 0.318 cm thick spaced at 1.27 cm intervals. The discs furnished a nominal surface area for biomass attachment of about 1.14 m$^2$ and the shaft was turned at 17 rpm.

The reactor was operated with approximately 70 to 80 percent of the disc area submerged in wastewater. Headspace pressure was monitored by a pressure gauge and wastewater flow through the reactor was regulated by controlling the speed of the pump. The reactor, during operation, was kept at a temperature of between 32° and 38° C. Offgases were vented through the vacuum pump and measured using a water displacement technique. The substrate used for a carbon source was sucrose while sodium bicarbonate and inorganic nutrients were added to the influent to provide an influent of known constant strength.

The reactor was operated under different mass loading conditions and pressure combinations and the results are tabulated below:

| EXPERIMENTAL CONDITIONS | Gas Phase Absolute Pressure (Atmospheres) | | |
|---|---|---|---|
| | 1.0 | 0.80 | 0.54 |
| [3000 mg/l] | | | |
| Mass COD Applied (gm/day) | 48.63 | 47.04 | 48.65 |
| Observed VSS Growth Yield | 0.165 | 0.212 | 0.329 |
| Surface Area Used (m$^2$) | 0.855 | 0.855 | 0.855 |
| Methane Yield (liters/g COD Removed) | 0.287 | 0.224 | 0.213 |
| Areal Removal Rate (Kg COD/m$^2$-day) | 0.04965 | 0.05208 | 0.05253 |
| Volumetric Removal Rate (Kg COD/m$^3$-day) | 6.324 | 6.634 | 6.691 |
| Percent Removal | 87.3 | 94.7 | 92.9 |
| [5000 mg/l] | | | |
| Mass COD Applied (gm/day) | 70.00 | 89.24 | 92.50 |
| Observed VSS Growth Yield | 0.159 | 0.253 | 0.200 |
| Surface Area Used (m$^2$) | 1.140 | 0.855 | 0.855 |
| Methane Yield (liters/g COD Removed) | 0.364 | 0.347 | 0.203 |
| Areal Removal Rate (Kg COD/m$^2$-day) | 0.05226 | 0.08650 | 0.09156 |
| Volumetric Removal Rate (Kg COD/m$^3$-day) | 6.657 | 11.018 | 11.662 |
| Percent Removal | 85.1 | 82.9 | 84.6 |
| [8000 mg/l] | | | |

-continued

| EXPERIMENTAL CONDITIONS | Gas Phase Absolute Pressure (Atmospheres) | | |
|---|---|---|---|
| | 1.0 | 0.80 | 0.54 |
| Mass COD Applied (gm/day) | 173.9 | 173.7 | 173.6 |
| Observed VSS Growth Yield | 0.227 | 0.289 | 0.309 |
| Surface Area Used (m$^2$) | 0.855 | 0.855 | 0.855 |
| Methane Yield (liters/g COD Removed) | 0.238 | 0.262 | 0.367 |
| Areal Removal Rate (Kg COD/m$^2$-day) | 0.1038 | 0.1074 | 0.1137 |
| Volumetric Removal Rate (Kg COD/m$^3$-day) | 13.217 | 13.676 | 17.028 |
| Percent Removal | 51.0 | 52.8 | 65.6 |

NOTE:
Areas and volumes are based on actual reactor capacity used to achieve removal values shown.

As can be seen, higher yields were observed for all reduced headspace gas pressures which is desirable at system startup and during recovery from extended toxic shocks. Not only was improved COD removal under vacuum operation observed but also an increase in COD utilization in each of the stages, particularly the first two stages, where the bulk of COD removal takes place. A linear relationship between headspace pressure and mass COD removal was observed. Under a reduced pressure of 0.54 atmospheres the first stage removal rate was about doubled for the loading at 3000 and 5000 mg of COD per liter of influent. For 8000 mg COD/liter influent, the removal rate increased by 77 percent. Typically about 62% of the total COD removal took place in the first two stages and linear relationship between pressure and removal rate indicates that both the mass and areal removal rates are significantly increased as a function of both increased loading and reduced headspace pressure.

Under atmospheric conditions, higher concentrations of propionic and butyric acids were observed in each stage of the reactor than observed at lower pressures. High concentrations of these acids reflect bacterial attempts to regulate redox potential, reduce acid equivalents and remove toxic accumulations of molecular hydrogen under stressed conditions. Vacuum operations helped to alleviate metabolic inefficiencies indicated by the presence of the propionic and butyric acids. As a result, greater COD removal and minimization of pH problems associated with start-up and shock organic loads on anaerobic systems can be obtained at reduced operating pressures. Furthermore, higher pH values at reduced pressures indicate that organic loadings of the anaerobic system can be increased under vacuum operation without the toxic effects related to low pH values.

The observed yield for the noted reactor range from 0.16 for atmospheric conditions to 0.33 at 0.54 atmospheres as illustrated in the table. Observed yield, as herein used, is defined as the mass of effluent volatile suspended solids generated per mass of COD removed across the reactor during steady state measurement periods. In each case, the observed yield measured under reduced headspace pressure was greater than that for atmospheric conditions. For high loading conditions with influent COD concentrations of about 8000 mg/liters methane yields increased substantially at 0.54 atmosphere.

The COD removal was observed to be largely completed in the first three stages of the reactor. The removal through the first three stages was analyzed in terms of areal removal rates in both a linear loading range and a non-linear loading range. Referring now to FIG. 4, the COD removal in terms of grams per square meter of contactor surface per day (g/m$^2$/dy) is plotted against the COD applied to the reactor. The curves show that the areal removal rates change linearly over the 50–125 g/m$^2$/dy COD range for varying headspace pressures with the lines becoming asymptotic to a limiting COD removal rate for each observed pressures.

Figure 5:
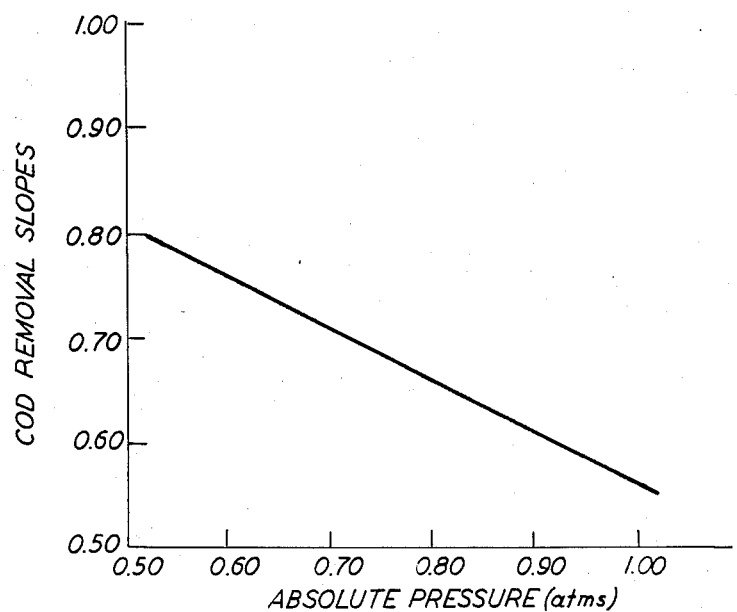
FIG. 5 is also a graphic representation showing the slopes of the linear portions of the curves shown in FIG. 4.

The slopes (COD removed/COD applied) of the linear portions of the curves shown in FIG. 4 are plotted as a function of headspace pressure in FIG. 5. The data clearly shows that areal removal rates increase substantially as headspace pressure is reduced. The linear portion of the curves can be described by the relationship:

$$M_R = M_A C(1.06 - 0.497P) - k(20.59P - 2.63) \quad (1)$$

where:
$M_R$ is the mass COD removed in g/m$^2$/dy,
$M_A$ is the mass COD applied to the reactor in g/m$^2$/dy,
C and k are constants relating to the source characteristics of the influent, and
P is the headspace absolute pressure in atmosphere.

The constants C and k are determined experimentally from empirical data for each classification of wastewater where the value of the constant is about 1.0 for easily degradable wastewater such as sugar and less than 1.0 for more complex wastewaters.

Figure 6:
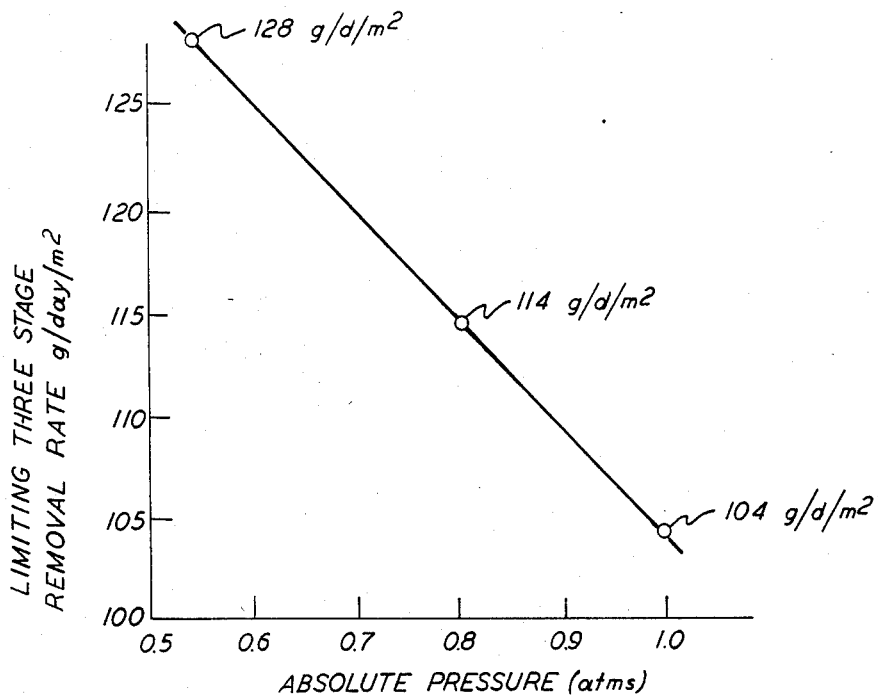
FIG. 6 is a graphic representation showing maximum COD removal rates as a function of attainable headspace pressure.

When the limiting COD areal removal rates indicated in FIG. 4 are plotted against headspace pressure as shown in FIG. 6, a linear relationship is evident. Here again the data clearly shows the limiting COD removal rate also varies linearly with pressure over a wide loading range. The maximum or limiting COD removal rate over this range is described by the relationship:

$$M_R = C(155.8 - 51.6P) \quad (2)$$

where the terms are again as described above.

From the observed data it is evident that subatmospheric headspace operation of the reactor improved both areal and volumetric COD mass removal rates. These improvements are found to be related linearly to the applied vacuum and thus easily adaptable for use in a computerized control system of the type herein described. As can be seen the controller can be programmed to regulate both the loading on the reactor and the vacuum maintained in the reactor housing to continually hold the system at optimum operating conditions. In this particular application it is assumed that the make-up of the wastewater influent is relatively constant and known. The rate of flow of the influent is thus a clear indication of the loading placed on the system. The flow sensor 47 is adapted to send flow data to the controller 45 by data line 56. Similarly, the pressure within the housing is also monitored by vacuum sensor 46 and this data is also provided to the controller via data line 59. As can be seen by knowing the mass rate of low being delivered to the system, the pressure within the housing can be set using vacuum control valve 42 to maintain the system at a desired operating point for optimum efficiency. Control signals are sent from the controller to the valve by means of control line 60.

As can be seen, reduced pressure operation of the anaerobic reactor results in a substantial improvement in COD removal for high loading conditions. Furthermore, both the linear and limiting COD removal rates vary linearly over a relatively wide operating range so that optimum operating conditions can be accurately predicted and the reactor easily controlled for maximum efficiency as herein described. For operational systems that are presently overloaded because of shock loading, pH, $H_2$, $H_2S$ and end product toxicity, an existing reactor can also be easily retrofitted for subatmospheric operation to thus alleviate the problems. In addition, vacuum operation will result in rapid biomass growth during start-up and accelerated recovery from extended toxic conditions.

While this invention has been described with specific reference to the above noted method, it should be clear to one skilled in the art that the invention is not limited by this disclosure.

We claim:

1. A method of treating wastewater containing anaerobically digestable nutrients and substrates that include the steps of passing wastewater influent through a gas-tight reactor to establish a sealed headspace over the surface of the wastewater in said reactor, rotating a plurality of partially immersed contactors through the wastewater contained in said reactor, each contactor having a biofilm thereon whereby the biofilm is sequentially passed through the wastewater and the headspace, evacuating the atmosphere in the headspace to establish a subatmospheric pressure therein;

sensing the pressure in the headspace, sensing the rate of flow of influent at the entrance to the reactor, relating the sensed pressure to the sensed rate of flow of the influent to determine the chemical oxygen demand (COD) removal rate, automatically adjusting the pressure in the headspace and the rate of flow of the influent to continually maintain the reactor at a desired operating condition.

2. The method of claim 1 wherein the chemical oxygen demand (COD) removal rate is determined for less than maximum removal by the relationship:

$$M_R = M_A C(1.084 - 0.48P) + k(16.24P - 6.44)$$

where:

$M_R$ is the mass of COD in $g/m^2/dy$, $M_A$ is the mass of COD applied in $g/m^2/dy$ C and k are both constants relating to the source characteristic of the influent, and P is the headspace absolute pressure in atmospheres, 3. The method of claim 1 wherein the chemical oxygen demand (COD) removal rate is determined for maximum removal by the relationship:

$$M_R = M_A C(155.8 - 51.6P)$$

wherein:

$M_R$ is the mass of COD removed in $g/m^2/dy$, $M_A$ is the mass of COD applied in $g/m^2/dy$, C is a constant relating to the source characteristic of the wastewater, P is the headspace absolute pressure in atmospheres.

4. The method of claim 1 that includes the further steps of partitioning the reactor into a plurality of sequential stages.

5. The method of claim 4 that includes the further step of mixing the influent before it passes into the first stage.

6. The method of claim 4 that includes the further step of adding additional influent to one or more selected stages.

* * * * *